United States Patent [19]
Pearson

[11] 3,841,150
[45] Oct. 15, 1974

[54] STRAIN GAUGE TRANSDUCER SIGNAL CONDITIONING CIRCUITRY
[75] Inventor: Robert P. Pearson, Saint Paul, Minn.
[73] Assignee: Honeywell Inc., Minneapolis, Minn.
[22] Filed: Nov. 2, 1973
[21] Appl. No.: 412,134

[52] U.S. Cl............................ 73/88.5 R, 73/398 AR
[51] Int. Cl............................ G01b 7/18, G01l 9/04
[58] Field of Search .... 73/88.5 R, 88.55 D, 398 AR

[56] References Cited
UNITED STATES PATENTS
3,572,109   3/1971   Yerman ........................ 73/88.55 D Primary Examiner—James J. Gill
Assistant Examiner—Anthony V. Ciarlante
Attorney, Agent, or Firm—Molinare, Allegretti, Newitt & Witcoff

[57] ABSTRACT

The disclosure describes circuitry for obtaining a pressure measurement from two strain gauge resistors mounted on a diaphragm which moves in response to changes in pressure. Operational amplifiers produce constant current flow through the resistors. A difference amplifier produces a measurement voltage corresponding to the difference in voltage across the resistors due to pressure variations. A unique positive feedback circuit is used in connection with the operational amplifiers to linearize the measurement voltage with respect to pressure changes. Temperature correction circuitry is used to maintain a constant measurement voltage scale over a wide range of temperature.

9 Claims, 5 Drawing Figures

3,841,150

3,841,150

STRAIN GAUGE TRANSDUCER SIGNAL CONDITIONING CIRCUITRY

BACKGROUND OF THE INVENTION

1. Field of the Invention

The present invention relates to strain gauges and more particularly relates to strain gauges used to measure pressure.

2. Description of the Prior Art

A variety of strain gauges used to measure pressure have been devised in the past. Normally strain gauge resistors are mounted on a moveable diaphragm which stretches or moves with changes in pressure so that various degrees of strain are placed on the resistors. Changes in resistance resulting from the variable strain provide an indication of the degree of pressure applied to the diaphragm.

In the systems of which the applicant is aware, two strain gauge resistors are arranged to respond to movement of a diaphragm due to applied pressure. While the temperature coefficients of these resistors can be matched, it has been found that the values of the resistance cannot be matched at the same time. In order to initially balance the resistor values, it has been necessary to place trimming resistors in series with or across one or both of the strain gauge resistors to form a Wheatstone Bridge arrangement. This process, however, results in a disruption of the temperature coefficient equality and introduces additional errors. One such arrangement is shown in U.S. Pat. No. 3,457,493 (Shoemaker et al. — July 22, 1969) which describes two strain gauge resistors biased by constant current sources through lead lines having lumped constant resistances which form two legs of the bridge arrangement.

SUMMARY OF THE INVENTION

In order to overcome the deficiencies of the prior art, applicant has devised circuitry which eliminates the need to use a bridge circuit in connection with a pressure sensitive strain gauge. According to a principal feature of the applicant's invention, two strain gauge resistors are biased by operational amplifiers in a manner which maintains a constant current flow through the resistors and, at the same time, provides a low output impedance which enables a differential circuit to produce a measurement signal that accurately corresponds to a change in pressure.

According to another feature of the invention, a portion of the measurement signal is fed back to the operational amplifiers in order to increase the linearity of the measurement signal with respect to changes in pressure.

According to still another feature of the invention, a unique temperature correction circuit maintains the span of the measurement voltage corresponding to a predetermined pressure change at a substantially constant value over a wide range of temperatures.

DESCRIPTION OF THE DRAWINGS

These and other advantages and features of the present invention will hereafter appear in connection with the accompanying drawings in which like numbers refer to like parts throughout and in which.

DESCRIPTION OF THE PREFERRED EMBODIMENT

Figure 1:
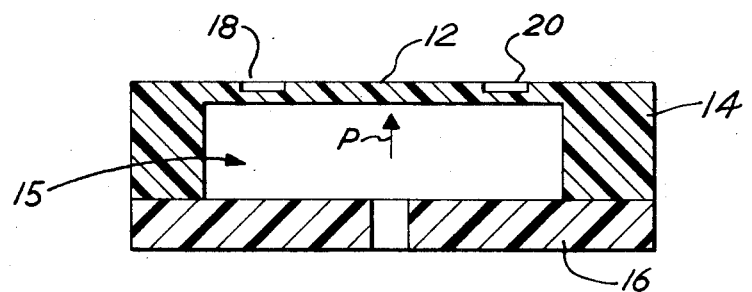
FIG. 1 is a cross sectional, schematic view of a preferred form of strain gauge resistor assembly for use in connection with the present invention.
Figure 2:
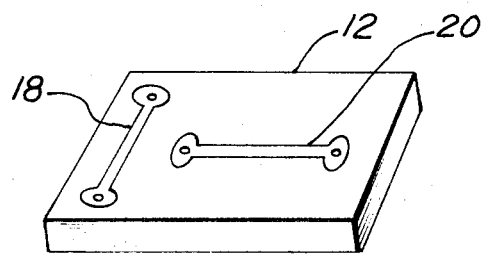
FIG. 2 is a fragmentary, diagrammatic, enlarged, isometric view of a portion of the resistor assembly shown in FIG. 1.

FIGS. 1 and 2 diagrammatically illustrate a preferred form of strain gauge resistor assembly 10 for use in connection with the present invention. The assembly basically comprises a thin circular silicon substrate 12 which acts as a diaphragm. The substrate is integrally formed into a circular sidewall fabricated in the shape of a cup 14 which encloses a pressure chamber 15. The cup is fitted with a silicon back plate 16 in which a channel 17 is bored to gain access to chamber 15. Substrate 12 is displaced in the direction of arrow P by pressure applied to chamber 15.

Referring to FIG. 2, strain gauge resistors 18 and 20 are diffused into substrate 12. As shown in FIG. 2, the resistors are arranged perpendicular to each other so that the resistance of one varies inversely to the resistance of the other. That is, the resistance of one resistor increases and the resistance of the other resistor decreases as the pressure applied to substrate 12 varies. Since resistors 18 and 20 are diffused into the same diaphragm or substrate, it is possible to obtain very close matching of their temperature coefficients. A strain gauge resistor assembly similar to assembly 10 is embodied in a Vutronik Transmitter sold by the Industrial Division of Honeywell Inc.

Figure 3:
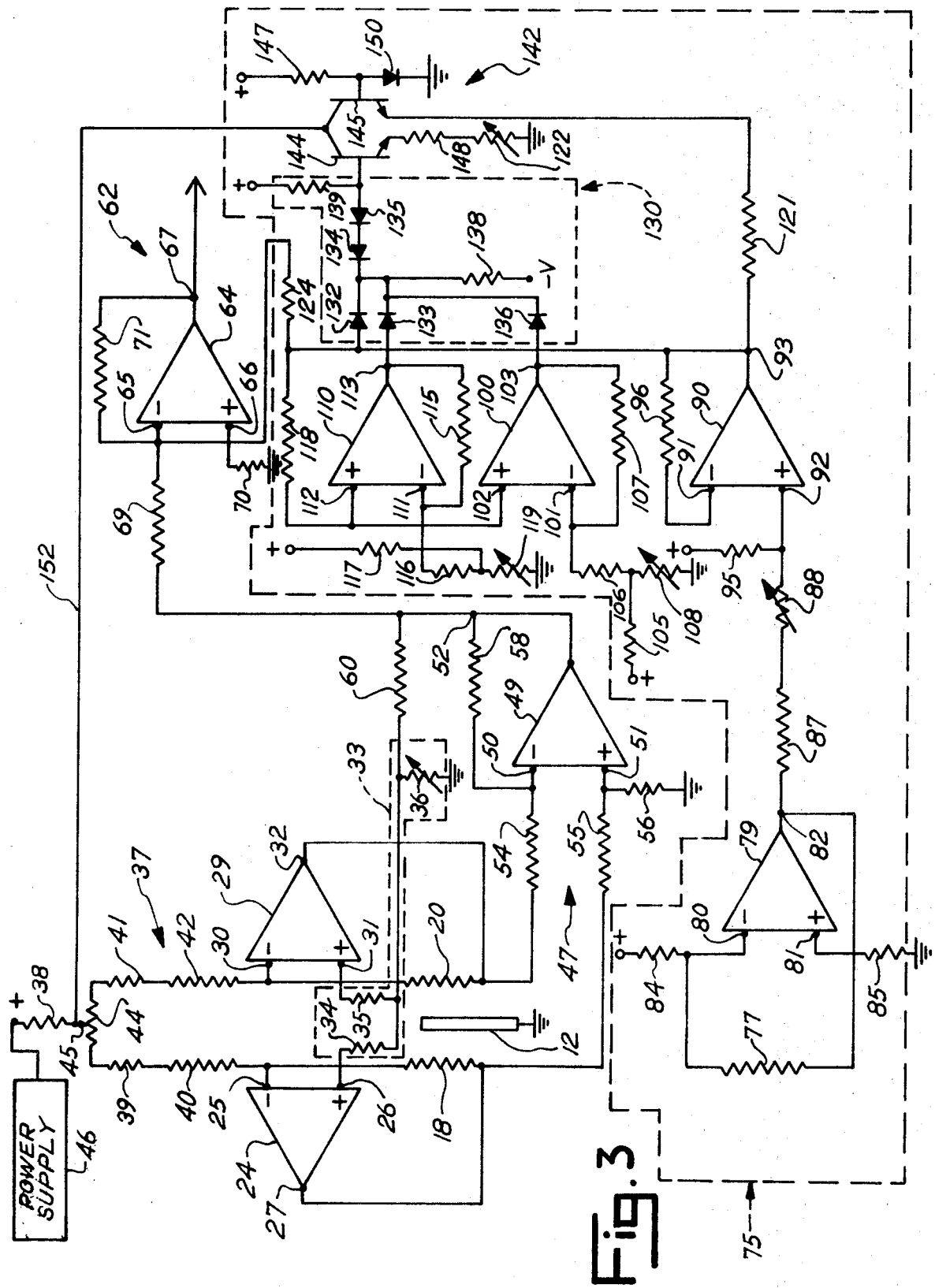
FIG. 3 is an electrical schematic drawing of a preferred form of circuitry for conditioning the signals produced by the resistor assembly shown in FIGS. 1 and 2.

Referring to FIG. 3, a preferred form of signal conditioning circuitry made in accordance with the present invention basically comprises an operational amplifier 24, an operational amplifier 29, a resistance network 33, a biasing network 37, a differential circuit 47, a linearizing feedback resistor 60, an output circuit 62, and a temperature scale correction circuit 75.

More specifically, operational amplifier 24 comprises an inverting input 25, a non-inverting input 26 and an output 27. Likewise, operational amplifier 29 comprises an inverting input 30, a non-inverting input 31 and an output 32. Conventional operational amplifiers, such as Micro A 741's can be utilized in the circuitry. The operational amplifier utilized should have an input impedance of greater than 250,000 ohms and an output impedance of less than 100 ohms.

Resistance network 33 is utilized to connect the non-inverting inputs of operational amplifiers 24 and 29 to a current sink, such as ground potential. The network comprises resistors 34 and 35, as well as a variable potentiometer 36 connected as shown. It should be noted that resistors 34–36 have a relatively low value so that inverting inputs 25 and 30 are maintained at a potential less than one volt below ground. As a result, inverting inputs 25 and 30 are maintained very close to virtual ground potential so that an unintended leakage impedance placed between ground and the junction of resistors 40 and 18 or between ground and the junction of resistors 42 and 20 has little or no effect on the operation of the circuitry. This is an important feature which substantially increases the overall reliability of the system.

Biasing network 37 is used to adjust the DC quiescent current flowing through strain gauge resistors 18 and 20. The network comprises resistors 38–42 and an adjustable potentiometer 44 having a slider arm 45. A standard power supply 46 provides biasing network 37 with a source of DC voltage.

Differential circuit 47 comprises an operational amplifier 49 connected as a difference amplifier to strain gauge resistors 18 and 20. The operational amplifier includes an inverting input 50, a non-inverting input 51 and an output 52 which generates a measurement voltage proportional to the pressure applied to chamber 15. Differential circuit 47 also includes input resistors 54–56 and a feedback resistor 58 connected as shown.

According to a unique feature of the present invention, a portion of the measurement voltage appearing at output 52 is fed back to resistance network 33 by means of a linearizing feedback resistor 60. As will be explained in more detail later, this resistor enables the measurement voltage to be more linear with pressure.

Output circuit 62 comprises an operational amplifier 64 having an inverting input 65, a non-inverting input 66 and an output 67 which produces a pressure voltage corrected for both pressure linearity and temperature span variation. The circuit also includes input resistors 69 and 70 and a feedback resistor 71 connected as shown.

Temperature scale correction circuit 75 comprises a temperature sensing resistor 77 which may be diffused into substrate 12. Resistor 77 varies its resistance with temperature in order to provide an indication of the change in temperature to which the substrate is exposed. Resistor 77 is conditioned by an operational amplifier 79 having a inverting input 80, a non-inverting input 81 and an output 82. Operational amplifier 79 is controlled by biasing resistors 84 and 85. The terminal at the upper end of resistor 84, as well as all other terminals marked with a +sign are connected to a positive voltage source within power supply 46.

The output of operational amplifier 79 is connected to a resistor 87 and adjustable potentiometer 88. As will be explained in more detail, potentiometer 88 enables the output to be adjusted for zero volts at the temperature corresponding to the minimum span of the measurement voltage appearing at output 52.

Figure 4:
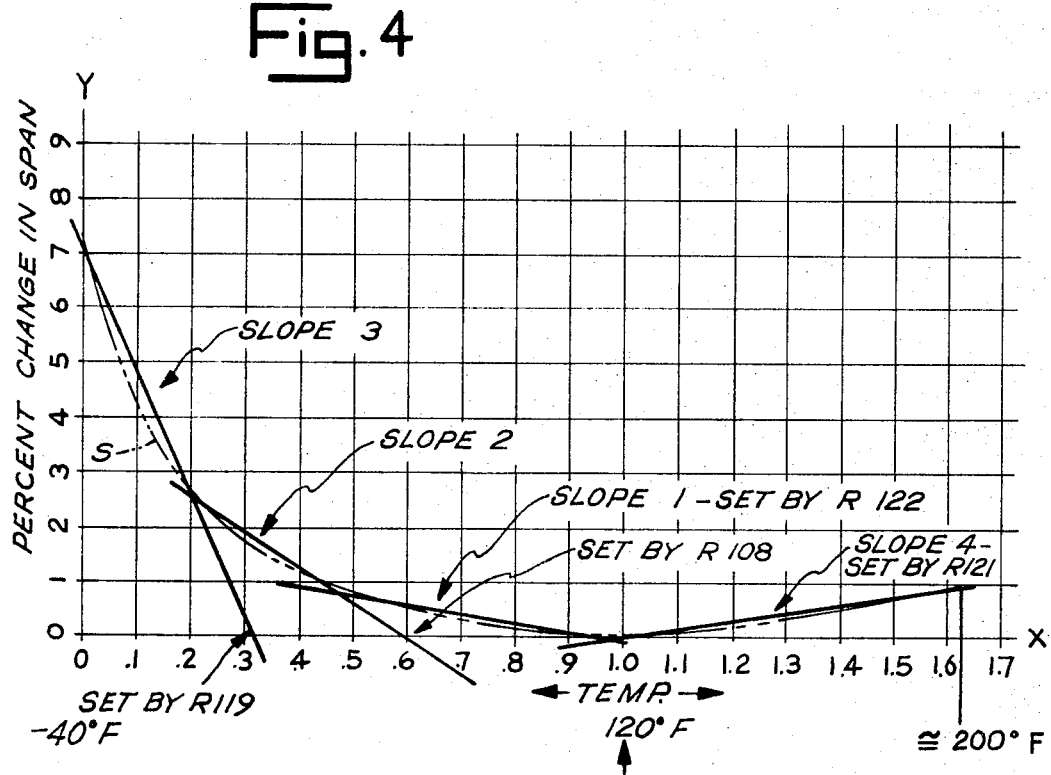
FIG. 4 is a chart showing the manner in which the temperature correction circuitry illustrated in FIG. 3 operates.

Circuit 75 further comprises a temperature correction operational amplifier 90 having an inverting input 91, a non-inverting input 92 and an output 93 which produces a correction signal corresponding to slope 1 of FIG. 4. The amplifier is controlled by resistors 95, 96 and an adjustable potentiometer 122. Another temperature correction operational amplifier 100 comprises an inverting input 101, a non-inverting input 102 and an output 103 that produces a correction signal corresponding to slope 2 of FIG. 4. Amplifier 100 is controlled by biasing resistors 105–107 and an adjustable potentiometer 108. Circuit 75 also includes another temperature correction operational amplifier 110 having an inverting input 111, a non-inverting input 112 and an output 113 that produces a correction signal corresponding to slope 3 of FIG. 4. Amplifier 110 is controlled by resistors 115–118 and an adjustable potentiometer 119.

Circuit 75 also includes a slope setting resistor 121 as well as a linear temperature compensating resistor 124. Resistor 121 produces a temperature correction signal corresponding to slope 4 of FIG. 4. A switching circuit 130 enables only one of the outputs from operational amplifiers 90, 100 and 110 to be effective at a time. The circuit includes diodes 132–136 and resistors 138 and 139 connected as shown. The terminal at the lower end of resistor 138 is connected to a negative voltage supply in power supply 46. In addition, each of the operational amplifiers is supplied with a positive and negative DC voltage from power supply 46.

Switching circuit 130 operates a drive circuit 142 including transistors 144, 145, resistors 147, 148, and a diode 150 connected as shown. The drive circuit produces a temperature correction bias voltage on a conductor 152 that is transmitted to biasing circuit 37.

Figure 5:
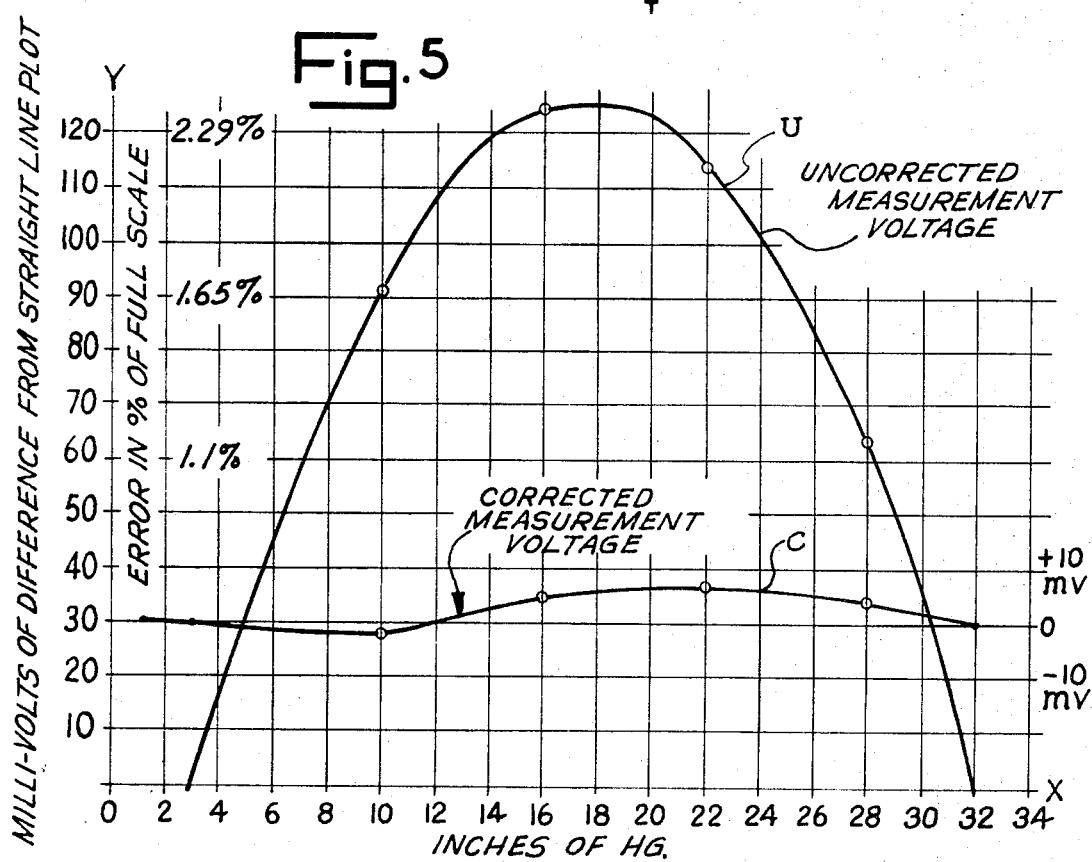
FIG. 5 is a chart showing the manner in which the pressure linearity feedback circuitry shown in FIG. 3 operates.

The operation of the circuitry will now be described in connection with FIGS. 3–5. In order to adjust the quiescent DC current flowing through strain gauge resistors 18 and 20, slider arm 45 is moved until an appropriate value is obtained. Once the quiescent current is established, operational amplifiers 24 and 29 maintain the current constant irrespective of changes in the resistance of resistors 18 and 20. This is an important feature since it eliminates the need for a Wheatstone Bridge arrangement used by prior art devices.

After the bias current through resistors 18 and 20 is set, potentiometer 36 is altered to adjust the portion of the measurement voltage fed back through resistor 60 to resistance network 33. Potentiometer 36 is adjusted until the measurement voltage at output 52 remains relatively linear as the pressure in chamber 15 is varied from about 3 to about 32 inches of mercury (Hg.). FIG. 5 illustrates the magnitude of correction which can be achieved by using this unique feedback circuit including resistor 60. Curve U of FIG. 5 represents a typical uncorrected measurement voltage achieved when resistor 60 is open. This measurement can be obtained by measuring the measurement voltage (output 52) at a pressure of 3 inches of mercury and about 32 inches of mercury. Of course, the measurements are made at a single temperature. After the pressures are recorded as two points on a graph, a straight line is drawn between the points. The measurement voltage is then measured as the pressure is varied in steps between 3 and 32 inches of mercury. For each step of voltage measured, the difference between the straight line value and the actual value is obtained in terms of millivolts and percent of full scale error, and is plotted to obtain curve U. By closing resistor 60 and adjusting potentiometer 36, the pressure linearity of the measured voltage at output 52 can be corrected to the approximate value shown by curve C in FIG. 5.

Referring to FIG. 4, the applicant has discovered that the span of the measurement voltage (output 52) reaches a minimum value at a particular temperature and expands at temperatures above and below the minimum value. In the example shown in FIG. 4, the span of the measurement voltage is at a minimum at about 120°F. In FIG. 4, the span voltage is drawn on the X axis and is used as a reference value. The span of the measurement voltage is the absolute difference in voltage generated at output 52 as the pressure is varied from about 3 to about 32 inches of mercury at a particular temperature. If the span is not maintained at a constant value over the temperature range of interest, the accuracy of the resulting pressure measurement is decreased.

As shown in FIG. 4, the applicant has found that the span may change by 7 percent over a temperature range from about −40°F. to about 200°F. A typical curve representing such a change in span is curve S of FIG. 4. This curve can be plotted by disconnecting the temperature scale correction circuit 75 and by measuring the span or absolute difference in measurement voltage as the pressure in chamber 15 is varied in steps from 3 to 32 inches of mercury at the various temperatures shown.

In order to correct the change in span, the applicant has designed a unique correction circuit 75. The circuit operates as a non-linear amplifier in which the gains of the various amplifier elements approximate the decrease in span represented by a predetermined portion of curve S (FIG. 4). The resulting amplifying characteristic is illustrated by slopes 1–4 in FIG. 4. Slopes 1–3 are established by operational amplifiers 90, 100 and 110, respectively, while slope 4 is established by the value of resistor 121.

After a curve similar to curve S is plotted for a particular strain gauge resistor assembly being used with the invention, adjustable potentiometer 88 is adjusted so that the voltage on conductor 152 is zero at the temperature corresponding to the minimum span, e.g., in the example given, 120°F. Above the minimum span temperature, the voltage on conductor 152 is negative, and below the minimum span temperature, the voltage on conductor 152 is positive. In order to condition operational amplifier 90 to produce an amplifying characteristic corresponding to slope 1 (FIG. 4), potentiometer 122 is adjusted. In order to condition operational amplifiers 100 and 110 to produce amplifying characteristics corresponding to slopes 2 and 3 (FIG. 4), potentiometers 108 and 119, respectively, are adjusted. As previously mentioned, in order to provide an amplifying characteristic corresponding to slope 4 (FIG. 4), the proper value for resistor 121 is selected.

Switching circuit 130 is arranged so that, at any temperature below 120°F., only one of operational amplifiers 90, 100 or 110 is operative through transistor 144 to alter the voltage on conductor 152 to produce an amplifying characteristic corresponding to one of slopes 1–3 shown in FIG. 4. In addition, switching circuit 130 is arranged so that, at any temperature above 120°F., only resistor 121 is operative through transistor 145 to produce an amplifying characteristic corresponding to slope 4. The temperature correction biasing voltage appearing on conductor 152 is transmitted to biasing circuit 37 in order to alter the DC current flowing through strain gauge resistors 18 and 20 so that the span of the measurement voltage appearing at output 52 remains substantially constant over the temperature range of interest. As a result of the pressure linearity and temperature correction circuitry, the pressure voltage appearing at output 67 is linearly proportional to the change in pressure applied to chamber 15 of strain gauge resistor assembly 10.

Those skilled in the art will recognize that only a single preferred embodiment of the present invention is disclosed herein and that the embodiment may be altered and modified without departing from the true spirit and scope of the invention as defined in the accompanying claims.

What is claimed is:

1. In a strain gauge comprising a first resistor and a second resistor carried by a substrate so that a variable strain is applied to the resistors in response to changes in the environment, improved apparatus for determining the changes in the environment by measuring the variations in an electrical property of the resistors comprising in combination:
    a first operational amplifier conprising a first noninverting input, a first inverting input and a first output;
    a second operational amplifier comprising a second non-inverting input, a second inverting input and a second output;
    circuit means for connecting the first and second non-inverting inputs to a current sink having a predetermined voltage;
    first means for connecting the first resistor between the first output and the first inverting input so that the current flowing through the first resistor remains constant in spite of changes in the resistance of the first resistor;
    second means for connecting the second resistor between the second output and the second inverting input so that the current flowing through the second resistor remains constant in spite of changes in the resistance of the second resistor;
    a voltage source;
    biasing means connected between the voltage source and the first and second inverting inputs for adjusting the quiescent current flowing through the first and second resistors; and
    differential means having inputs operatively connected to the first and second resistors and an output for producing a measurement voltage proportional to the difference in voltage across the first and second resistors.

2. Apparatus, as claimed in claim 1, wherein the circuit means comprises a resistance network having a resistance value such that the first and second inverting inputs are maintained at a potential of less than one volt.

3. Apparatus, as claimed in claim 1, wherein each of the first and second operational amplifiers has an input impedance of greater than 250,000 ohms.

4. Apparatus, as claimed in claim 1, wherein each of the first and second operational amplifiers has an output impedance of less than 100 ohms.

5. Apparatus, as claimed in claim 1, and further comprising means for feeding back a portion of the measurement voltage to the circuit means, whereby the pressure linearity of the measurement voltage is improved.

6. Apparatus, as claimed in claim 5, and further comprising temperature compensating means comprising:
    temperature sensing means for producing a voltage proportional to the temperature of the substrate;
    first correction means for generating a first correction signal having a magnitude proportional to the change of the measurement voltage span over a first temperature range;

second correction means for generating a second correction signal having a magnitude proportional to the change of the measurement voltage span over a second temperature range greater than the first temperature range; and switching means for transmitting to the biasing means a first temperature correction biasing voltage proportional to the first correction signal when the temperature of the substrate is in the first range and for transmitting to the biasing means a second temperature correction biasing voltage proportional to the second correction signal when the temperature of the substrate is in the second range.

7. Apparatus, as claimed in claim 6, wherein the first temperature range and the second temperature range lie below and above a minimum span temperature respectively at which the measurement voltage span is a minimum.

8. Apparatus, as claimed in claim 7, wherein the first correction means comprises an operational amplifier.

9. Apparatus, as claimed in claim 8, wherein the switching means comprises a diode network connected to the first and second correction means.

* * * * *